Figure 1:
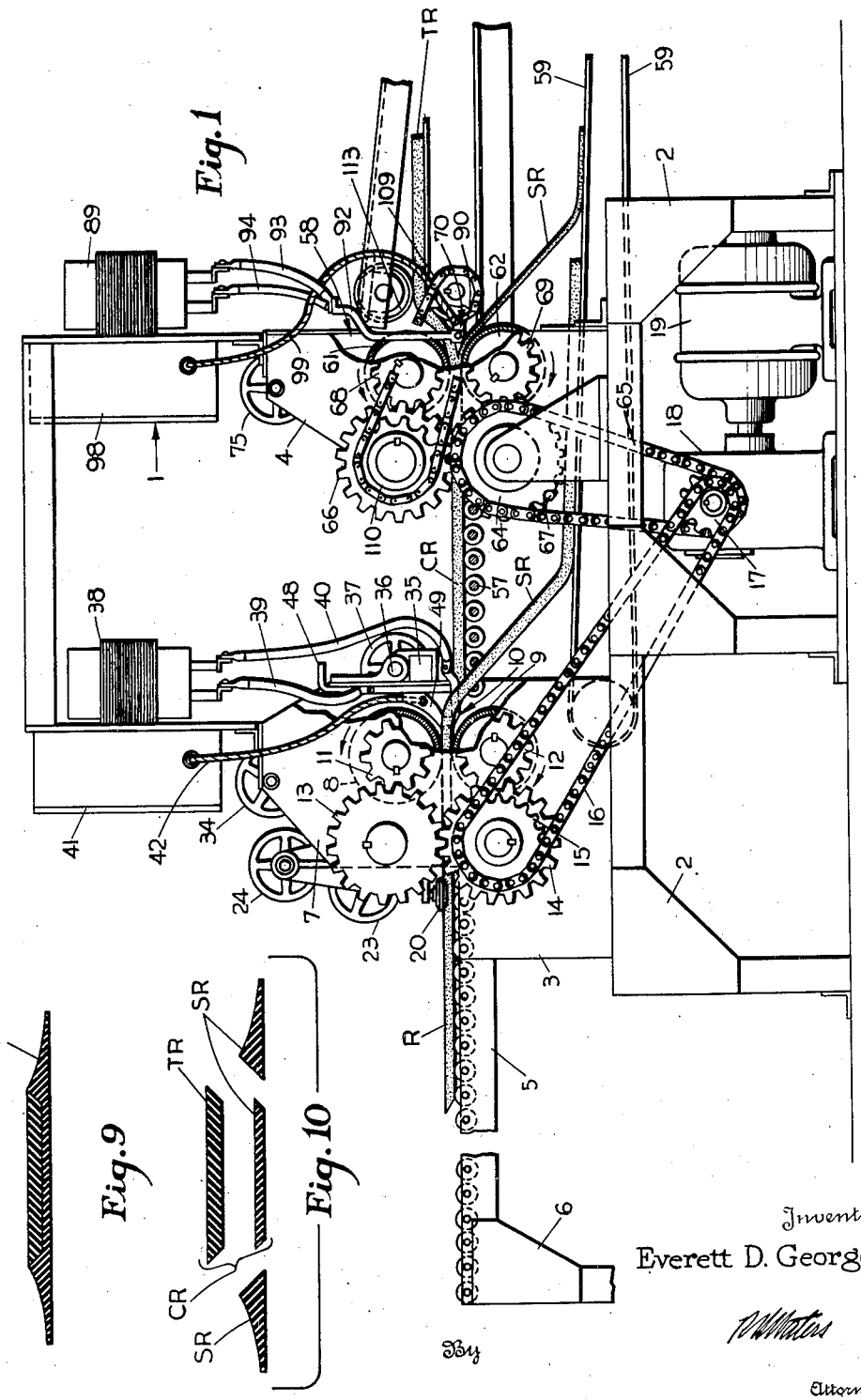

Oct. 11, 1949.  E. D. GEORGE  2,484,619
SLITTING APPARATUS
Filed Dec. 14, 1945  4 Sheets-Sheet 2

Inventor
Everett D. George

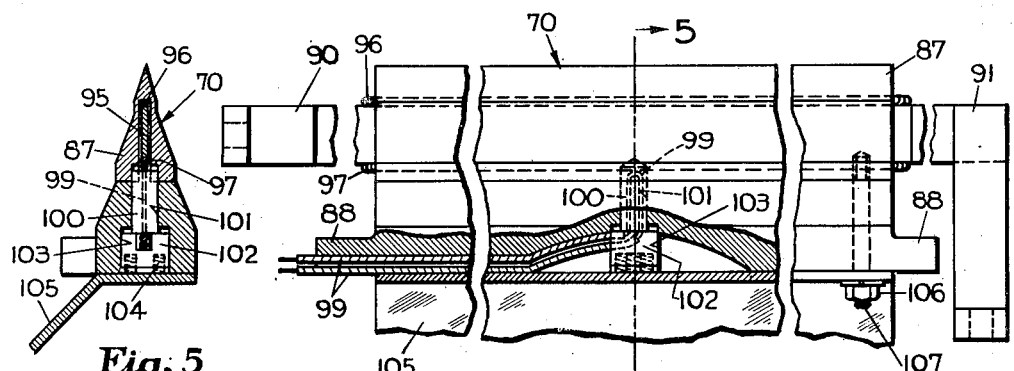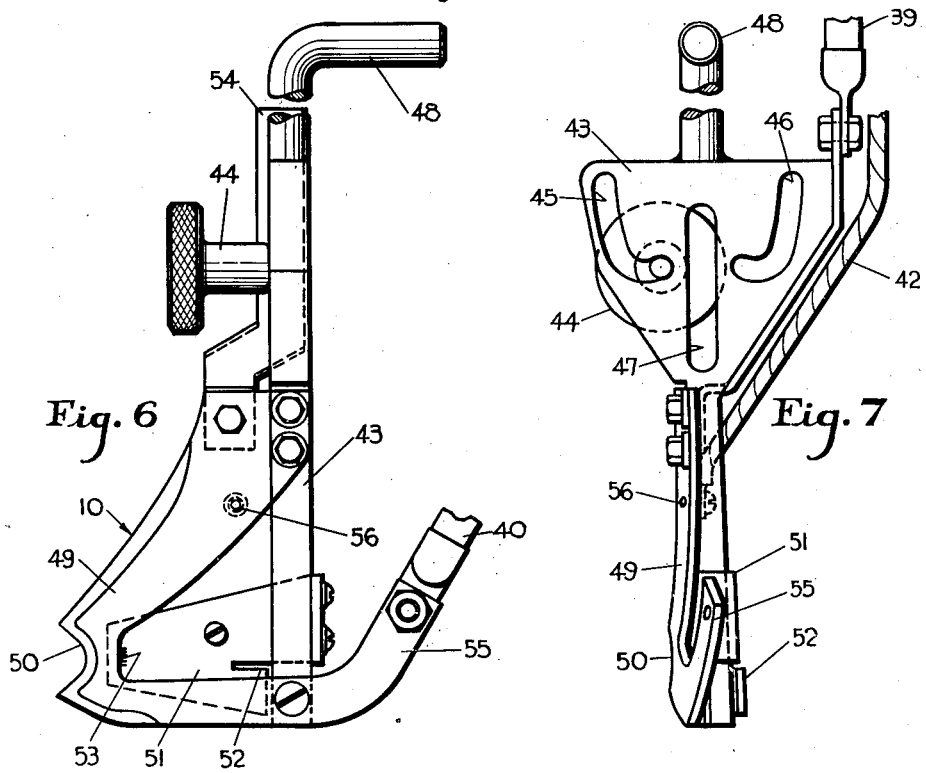

Oct. 11, 1949.　　　　　E. D. GEORGE　　　　　2,484,619
SLITTING APPARATUS

Filed Dec. 14, 1945　　　　　　　　　　　　　　　　4 Sheets-Sheet 4

INVENTOR.
Everett D. George
BY
R. H. Waters
Attorney

Patented Oct. 11, 1949

2,484,619

UNITED STATES PATENT OFFICE 2,484,619

SLITTING APPARATUS

Everett D. George, Cuyahoga Falls, Ohio, assignor to Wingfoot Corporation, Akron, Ohio, a corporation of Delaware Application December 14, 1945, Serial No. 634,994

12 Claims. (Cl. 164—38)

1

The present invention relates to apparatus for reclaiming portions of plastic materials in which a plurality of dissimilar compounds are employed in composite relation and distinguished by well-defined planes of separation. More particularly, the invention is concerned with a mechanism for subdividing and segregating plastic material, such, for example, as rubber tire stock and the like into the different unlike compounds of which it is composed.

It is an object of the present invention to provide apparatus for cutting the plastic material substantially along the planes of separation between the several different compounds which comprise the material.

Another object of the invention is to provide means for separating the several different compositions in the composite segments of material and to segregate the like compositions together.

A still further object of the present invention is to provide a mechanism by means of which the different compositions embodied in a composite plastic body can be separated and reclaimed.

The inventive concept is particularly advantageously adapted to be employed in reclaiming rubber tire stock and the like of the type employed in the manufacture of pneumatic tires. In such adaptations, the tire stock is advantageously made up of a portion of one composition which is employed as the sidewall and under-tread material and a portion of different composition to form the tread portion when fabricated into a tire. It is desirable to separate these dissimilar portions or compounds from one another in order that they may be reworked as first grade material.

In the manufacture of rubber stock for pneumatic tires, dissimilar rubber compounds are fed into an extrusion device and, as these compounds pass through the die, they are united into the finished tire stock. This union of the several unlike compounds affords a finished stock in which there are more or less definite planes of separation defining the several unlike bodies of material. It is necessary in checking the operation of the extrusion device to run a number of test stock segments to insure the desired proportions, disposition and dimensions of the several different compounds.

It is, therefore, an additional object of the present invention to subdivide each test segment of rubber stock into portions substantially defined by the planes of separation between the different compounds, to enable the reclamation of each individual material.

Other objects and advantages of the present invention will be apparent as the detailed description of a preferred form of apparatus proceeds. This apparatus is advantageously adapted to practice the teachings of the present invention and will best be understood by reference to the accompanying drawings.

Figure 2:
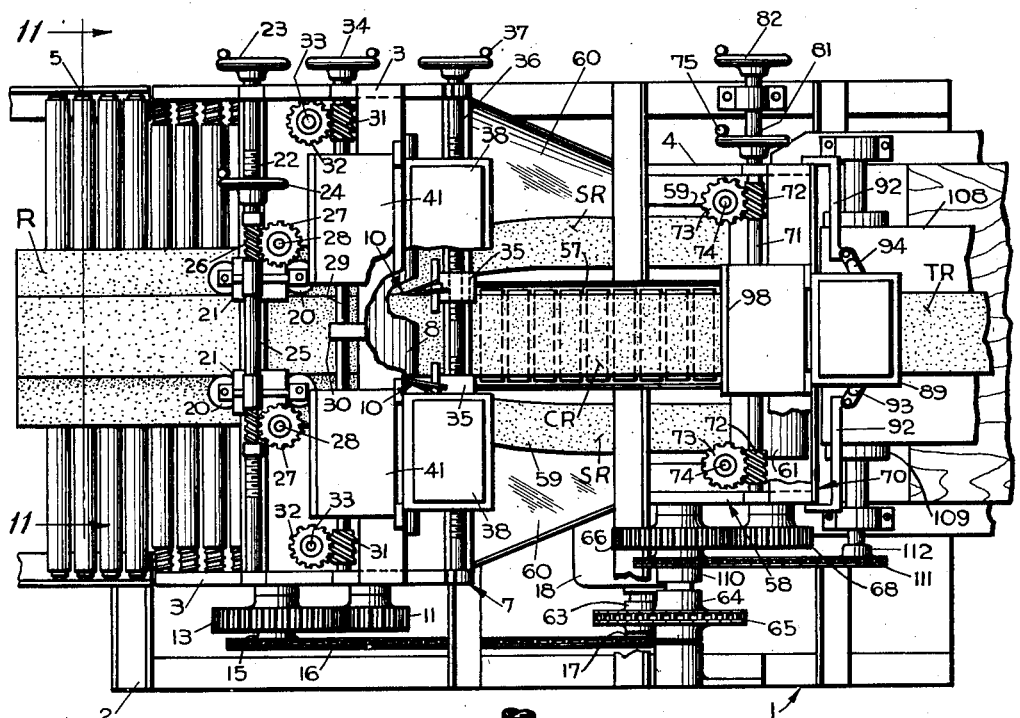
Figure 3:
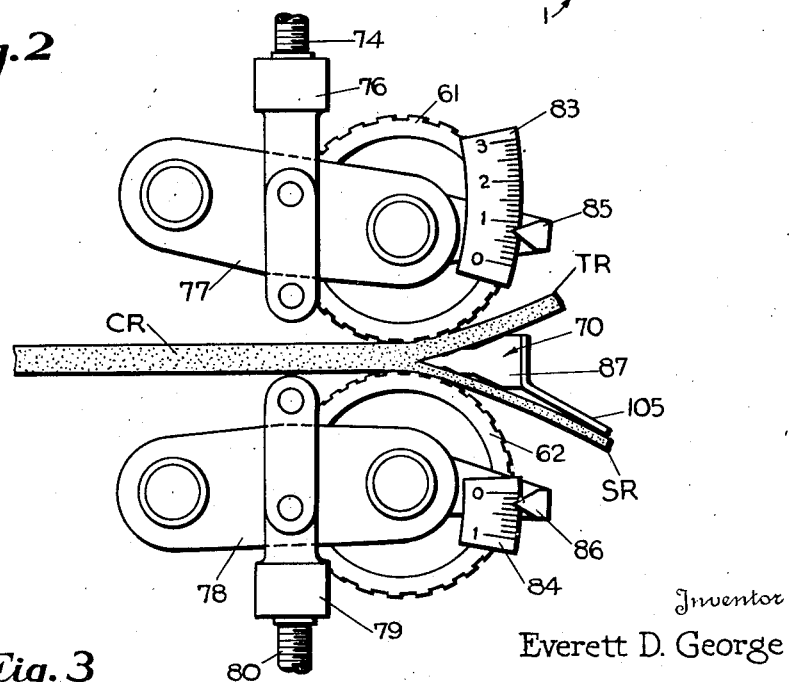

In the drawings, Figure 1 represents a side elevation of the machine assembly with parts broken away. Figure 2 is a fragmentary plan view with parts broken away to illustrate the disposition of certain elements of the combination. Figure 3 is an elevation with parts removed and broken away showing the adjustment features related to the rolls for feeding the plastic stock to the horizontal knife. Figure 4 is a plan view of the horizontal knife with parts broken away. Figure 5 is a vertical cross section through the horizontal knife taken along the line 5—5 in Figure 4.

Figure 11:
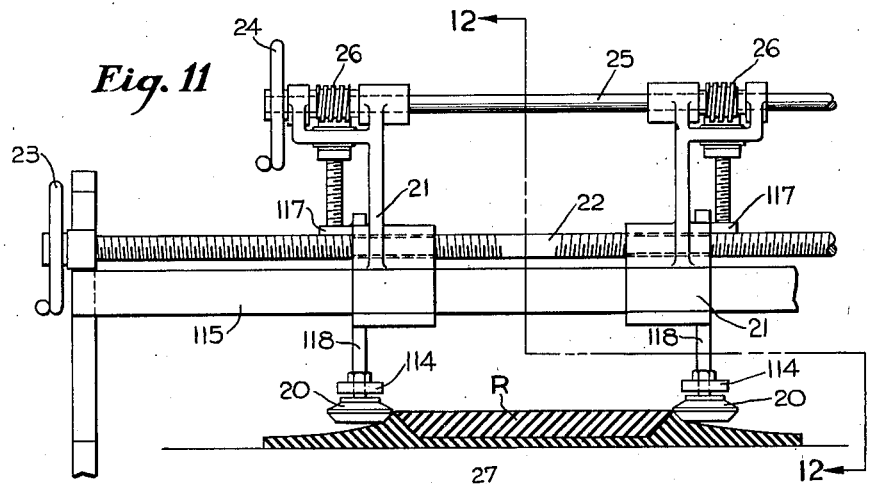
Figure 12:
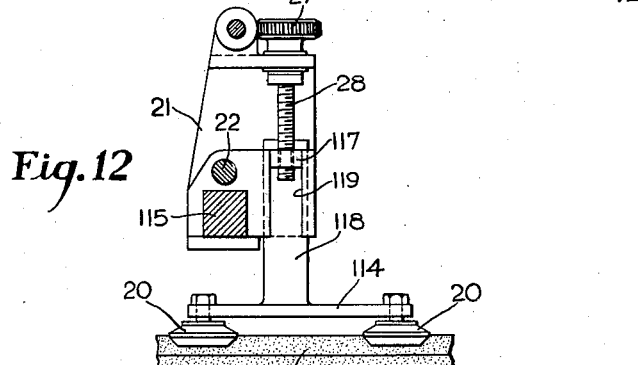
Figure 13:
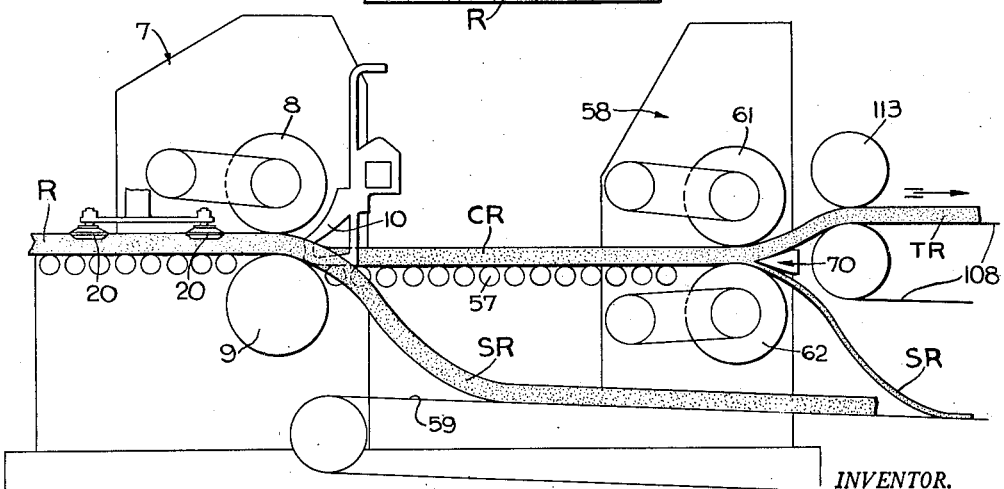

Figures 6, 7 and 8 are side elevation, end elevation and bottom plan, respectively, illustrating the details of one of the vertical knives of the apparatus. Figure 9 represents a cross-section of a typical segment of plastic material or composite rubber tire stock such as is used in forming the tread and sidewall portions of a pneumatic tire. Figure 10 illustrates the manner in which the material shown in Figure 9 is separated by the use of the apparatus of the invention. Figure 11 is a vertical cross-section taken through the apparatus of Figure 2 along the line 11—11 therein and having parts removed and broken away to provide a better understanding of the operation of the adjusting means. Figure 12 is a vertical cross-section taken substantially along the line 12—12 in Figure 11. Figure 13 is a diagrammatic illustration of the essential elements of the apparatus of the invention illustrating its mode of operation.

In Figure 1, one form of tread compound separator apparatus, hereinafter referred to simply as a "separator" embodying the teachings of the present invention, is identified generally by the reference character 1. The separator 1 includes a supporting structure comprising a base 2 and supporting plates or frames 3 and 4. A roller type conveyor table 5 extending between and supported at its ends by frame 6 and the supporting frame 3 serves to deliver the tread stock R to the sidewall cutter apparatus 7.

The sidewall cutter 7 of the separator 1 embodies a pair of bight rolls 8 and 9 which serve to feed the tread stock R at a predetermined constant rate to a pair of vertically disposed knives 10, the design and adjustment of which will be described in detail hereinafter. The rolls 8 and 9 are rotatably mounted in the frame 3 and are adapted to be driven by gears 11 and 12, respectively, actuated by the intermeshing gears 13 and 14, respectively, of which the latter is mounted upon a shaft driven by a sprocket 15. The sprocket 15 is driven through a chain 16 by sprocket 17 on the output shaft of a change-speed or gear reduction drive 18 directly connected to motor 19.

As the tread stock R traverses the roller conveyor table 5, a plurality of roller guides 20 (Figure 2) in the sidewall cutter 7 serves to center the material properly for the bight rolls 8 and 9 and the vertical knives 10. The guides 20 are freely rotatably supported on the horizontal tie bars 114 (see Figures 11 and 12) from carriages 21 which are capable of shiftable movement in a horizontal plane along the square shaft 115 toward and away from each other as by means of the screw shaft 22 (see Figure 2) which has a left and right hand thread cut thereon to engage a portion of each of the carriages 21. The screw shaft 22 is adapted to be rotated as by means of the hand wheel 23. It will be understood from Figures 11 and 12 that the carriages 21 are capable of movement only in a horizontal plane by virtue of their slidable mounting on the square shaft 115 rigidly secured to the machine frame.

A second hand wheel 24, as shown in Figures 11 and 12, actuates a shaft 25 disposed in generally parallel relation to the screw shaft 22 both of which extend transversely of the machine frame 2. The shaft 25 is advantageously provided with spaced worms 26 which drive gears 27 mounted on the uppermost ends of vertical shafts 28. The vertical shafts 28 have screw threads formed thereon to engage internally threaded block portions 117 on the vertical legs 118 of the tie bars 114 to raise and lower the guides 20. The block portions 117 and the legs 118 are slidably engaged in the ways 119 formed on the carriages 21.

The above described arrangement renders the apparatus capable of receiving a wide variation of sizes and shapes of stock cross-sections.

A similar adjustable mounting is provided for the upper bight roll 8 with respect to the fixed rotatably mounted lower bight roll 9. This adjustment is achieved by the use of a transverse shaft 29 which is rotatably mounted in the frames 3 and bracket 30. Worms 31 on the shaft 29 are arranged to actuate gears 32 secured to the uppermost ends of vertical shafts 33 which, as in the case of the above described adjustment for the roller guides, are adapted to raise or lower by means of a screw thread a pivotal bearing mounting (not shown) to position the roll 8. A hand wheel 34 operates the shaft 29.

The vertical knives 10 are supported upon internally threaded blocks 35 which threadably engage the opposed threaded portions of the transverse screw shaft 36 rotatably mounted in the frames 3 and operable as by means of the hand wheel 37. The knives 10 are constructed and adapted to act as resistors in an electrical circuit involving the transformers 38 which insure a low voltage, high amperage current and are interconnected with said knives as by conductors 39, 40. The current supplied by the transformers 38 quickly raises the vertical knives 10 to the desired cutting temperature and greatly simplifies the cutting operation.

A suitable temperature control 41 is connected to each of the knives 10 by means of a thermocouple 42. It is the function of each temperature control 41 to control the supply of electrical current from the electrical power lines (not shown) to its associated transformer 38. The temperature control 41 is advantageously set at the predetermined desired cutting temperature and it operates to maintain the flow of the proper amount of electrical current to the transformer 38 to keep the knife 10 associated therewith at the proper cutting temperature throughout the cutting operation.

At the first station on the machine or the sidewall cutter 7, the substantially vertically disposed knives serve to separate the stock R into a composite center section CR and sidewall sections SR of which the latter are made up of one type compound as will best be seen from Figures 9 and 10. The knives 10 are advantageously capable of very close adjustment both as to spacing and angularity with respect to a vertical plane. A mounting plate 43 (see Figures 6, 7 and 8) forms a part of the knife 10 by which the unit is adjustably secured to the block 35 as by means of the knurled headed screw 44, which registers with one or the other of arcuately formed slots 45, 46 or vertical slot 47, as desired, to properly position the knife to insure accurate segregation of the SR and CR portions of the stock R depending upon the character of the particular stock.

To facilitate the adjustable positioning of the knife 10 and the mounting plate 43 a handle portion 48 is advantageously welded to the plate. The lowermost portion of the mounting plate 43 carries the blade 49 having an angular shape and a notch 50 formed in the sharpened edge thereof to engage the stock R as it is fed thereto by the bight rolls 8 and 9. A deflector element 51, having a bent guide portion 52 is also secured to the mounting plate 43 with a portion thereof held in contact with plate 49 adjacent the notch 50 as by welding at 53 (see Figure 6).

A strip 54 of electroconductive material extends downwardly from a position adjacent the handle 48 and mounting plate 43 and is secured to the uppermost end of the blade 49 to receive the conductor 39 from the transformer 38. A tail portion 55 on the blade 49 provides a second connection for the knife 10 to accommodate the conductor 40 from the transformer 38. The screw 56 threaded into the blade 49 of the knife 10 affords a convenient means of connection for the thermocouple 42.

After the stock R passes the vertical knives 10 which separate the sidewall portions SR from the composite center section CR, the latter is carried over by the auxiliary roller carrier 57 to the tread slitter unit 58 the purpose of which is to separate the under-tread stock SR (of the same compound as the sidewall sections) from the tread stock TR. An endless belt conveyor 59 is mounted at a plane below that of the carrier 57 to receive the sidewall stock SR as it is cut off, the stock R and deflected laterally by the flared guide portions 52 of the deflectors 51 associated with the blades 49 of the knives 10. The conveyor belt 59 delivers the sidewall stock SR to a suitable stock pile. A chute 60 (see Figure 2) extends inwardly and downwardly with respect to the conveyor belt 59 and serves to guide the sidewall stock SR to the conveyor belt 59.

The carrier 57 conveys the composite center section CR in the bight of the adjustable bight rolls 61, 62 of the tread slitter unit 58 for the further subdivision and segregation of the stock R into its several component compounds. The rolls 61 and 62 are driven by the motor 19 through the gear reduction drive unit 18 on the output shaft of which is mounted a sprocket 63 for driving sprocket 64 as by means of the chain 65. The train of gears 66, 67, 68, 69, which are intermeshed as shown in Figure 1, serve to operate the bight rolls 61 and 62 to accept the stock CR and advance it to the horizontally disposed cutter 70 for the separation of the additional stock SR from the tread portion TR of the original stock segment R.

The bight rolls 61 and 62 of the tread slitter unit 58 are both adjustably mounted in the frames 4 in order to enable the stock CR to be properly presented to the cutter 70 which is fixed. The adjustment of the bight rolls 61 and 62 is advantageously achieved by the transverse shaft 71 on which is mounted a pair of worms 72 for actuating gears 73 mounted upon vertical screw shafts 74. The hand wheel 75 operates the shaft 71 to rotate the screw shafts 74 to raise and lower the clevises 76 actuating the pivotally mounted arms 77 (see Figure 3) which support the bight roll 61 from frames 4.

The bight roll 62 is adjustably supported in a manner similar to the mounting of roll 61. The roll 62 is rotatably mounted on a pair of arms 78 which are, in turn, pivotally secured to the frames 4. A pair of clevises 79 is employed to raise or lower the arms 78 when the vertical screw shafts 80 are actuated. This action of the screw shafts 80 is accomplished by worms and gears (not shown) operated by the lower transverse shaft 81 (see Figure 2) which is provided with hand wheel 82 and extends across the machine proper between frames 4.

Suitable scales 83 and 84 (see Figure 3) may be mounted on the outer face of one of the frames 4 (omitted in Figure 3) of the tread slitter 58. The pointers 85 and 86 adapted to register with the scales 83 and 84, respectively, are mounted upon the arms 77 and 78 to facilitate the accurate vertical adjustment of the rolls 61 and 62 with respect to cutter 70. In this way, it is possible to regulate the depth of slit made by cutter 70 in the center tread stock CR quite carefully and to closely approximate the plane of separation between the tread stock TR and the compound SR used in the under-tread portion of the stock R (see Figures 9 and 10).

The cutter 70 embodies a blade 87 which advantageously possesses a cross-section closely approximating the shape of an isosceles triangle to facilitate the separation of the stocks. The blade 87 is supported between the frames 4 of the tread slitter 58 as by means of the lugs 88. Electrical energy is carried to the knife blade 87 from the transformer 89 by the electroconductive bus bar brackets 90, 91 secured to conductors 92 and connected, in turn, with the transformer by means of the insulated cable connections 93, 94. A resistance element 95 is connected by means of conductors 96, 97 with the brackets 90 and 91.

A suitable temperature control 98 on the tread slitter unit 58 is connected by a thermocouple connection 99 to the blade 87. The wires of the thermocouple connection 99 are connected internally and substantially centrally of the blade 87 adjacent the resistance element 95 by passing them through an insulator plug 100 inserted in a hole 101 drilled into the base of the blade 87 toward the apex of its triangular section (see Figure 5). A cylindrical block 102 of suitable insulating material is fitted into the counterbore 103 of the hole 101 so as to contact the base of the plug 100 against which it is urged by a plurality of coil springs 104 backed up by a shield 105 secured to the blade 87 by nuts 106 on studs 107 threaded into the base thereof.

The shield 105 is so positioned on the blade 87 of cutter 70 that it operates effectively to deflect the under-tread stock SR away from the body of the blade 87 and generally downwardly toward the conveyor belt 59 upon which it is carried with the sidewall segments SR to the stock pile. The remainder of the center tread portion CR or the tread stock TR passes upwardly to a second conveyor belt 108 actuated by the pulley 109 which is driven by a sprocket 110, coacting with the gear 66, chain 111 and sprocket 112. The stock TR is carried to a suitable stock pile. A weighted roller 113 disposed in contact with the stock TR may be employed to assist in the removal of the stock from the cutter 70.

In the operation of the machine illustrated diagrammatically in Figure 13, the segments of the original stock R, which it is desired to separate, are placed on the carrier table 5 by the operator. The position of the roller guides 20 and the roll 8 is adjusted to accommodate the particular cross-section of the segment being introduced. It is necessary also to adjust the vertical knives 10 and to carefully locate the stock segments with respect to the cutter 70 to insure the proper separation and segregation of the several types of stock. The machine is advantageously provided with suitable conventional control units to start and stop the rolls and to control the supply of electrical current to the transformers 38, 89.

After the stock segment R is engaged between bight rolls 8 and 9 of the sidewall cutter apparatus 7, the remaining center tread section CR passing the vertical knives 10 will automatically advance to the bight rolls 61 and 62 of the slitter unit 58. The conveyor belts 59 and 108 may be so constructed that they carry the several component materials SR and TR of the composite rubber stock R to the proper stock piles for reconversion into usable first grade stock.

It will be apparent that certain modifications may be made in the structure of the apparatus hereinbefore described in detail in the delineation of the inventive concept without in any way limiting the scope or spirit of the invention.

While in accordance with the patent statutes one best known embodiment of the invention has been illustrated and described in detail, it is to be particularly understood that the invention is not limited thereto or thereby, but that the inventive scope is defined in the appended claims.

I claim:

1. Apparatus for subdividing segments of rubber stock and the like embodying a plurality of dissimilar compounds employed in composite relation and distinguished by planes of separation, said apparatus comprising a substantially vertically disposed means for cutting the composite stock along generally vertical planes of separation into a plurality of strips extending generally lengthwise of the stock segments, horizontally disposed means for additionally cutting at least certain of the component strips along the generally horizontal planes of separation, means for heating the several cutting means to facilitate the cutting operation, means supporting the vertically disposed cutting means, means adjustably controlling the position of the supporting means laterally of the stock, means adjustably controlling the depth of cut taken in the stock by the horizontally disposed cutting means, and means segregating the several subdivided strips of like compounds.

2. Apparatus for subdividing segments of rubber stock and the like embodying a plurality of dissimilar compounds employed in composite relation and distinguished by planes of separation, said apparatus comprising a substantially vertically disposed means for cutting the composite stock along generally vertical planes of separation into a plurality of strips extending generally lengthwise of the stock segments, horizonally disposed means for additionally cutting at least certain of the component strips along generally horizontal planes of separation, means for heating the several cutting means to facilitate the cutting operation, temperature control means for maintaining a predetermined temperature of the cutting means throughout the cutting operation, means supporting the vertically disposed cutting means, means adjustably controlling the position of the supporting means laterally of the stock, means adjustably controlling the depth of cut taken in the stock by the horizontally disposed cutting means, and means segregating the several subdivided strips of like compounds.

3. Apparatus for subdividing segments of rubber stock and the like embodying a plurality of dissimilar compounds employed in composite relation and distinguished by planes of separation, said apparatus comprising means feeding the stock, cutting means coacting with the feeding means to sever the stock into portions substantially along the planes of separation therebetween as the stock is passed through the cutting means by the feeding means, means adjustably controlling the position of the cut taken in the stock by the cutting means, and means segregating the several stock portions of like compounds.

4. Apparatus for subdividing segments of rubber stock and the like embodying a plurality of dissimilar compounds employed in composite relation and distinguished by planes of separation, said apparatus comprising means feeding the stock, cutting means coacting with the feeding means to sever the stock into portions substantially along the planes of separation therebetween as the stock is passed through the cutting means by the feeding means, means adjustably controlling the position of the cut taken in the stock by the cutting means, means heating the cutting means to facilitate the cutting operation, temperature control means for maintaining a predetermined temperature of the cutting means throughout the cutting operation, and means segregating the several stock portions of like composition.

5. Apparatus for subdividing segments of rubber stock and the like embodying a plurality of dissimilar compounds employed in composite relation and distinguished by planes of separation, said apparatus comprising means feeding the stock, adjustable guide means directing the stock to the feeding means, cutting means for slitting the stock both vertically and horizontally generally along the planes of separation, means heating the cutting means to facilitate the cutting operation, means adjustably controlling the position of the cut taken in the stock by the cutting means, and means segregating the several stock portions of like composition.

6. Apparatus for subdividing segments of rubber stock and the like embodying a plurality of dissimilar compounds employed in composite relation and distinguished by planes of separation, said apparatus comprising a vertical knife, means for adjusting said knife to sever the stock along a substantially vertical plane of separation, a pair of driven feed rolls at least one of which is adjustable to receive the stock and direct it to the vertical knife, adjustable guides for directing the stock to the feed rolls, a second pair of feed rolls both of which are adjustable, a fixed horizontal knife, means diverting portions of the stock from the first pair of feed rolls to the second pair, means heating the knives, and means for segregating those portions of the stock of like compounds.

7. Apparatus for subdividing segments of rubber stock and the like embodying a plurality of dissimilar compounds employed in composite relation and distinguished by planes of separation, said apparatus comprising a vertical knife, means for adjusting said knife to sever the stock along a substantially vertical plane of separation, a pair of driven feed rolls at least one of which is adjustable to receive the stock and direct it to the vertical knife, adjustable guides for directing the stock to the feed rolls, a second pair of feed rolls both of which are adjustable, a fixed horizontal knife, means diverting portions of the stock from the first pair of feed rolls to the second pair, means heating the knives, temperature control means for maintaining the heating means at a predetermined temperature, carrier means for removing certain of the portions of the stock cut by the vertical knife, a second carrier means for withdrawing additional portions of the remaining stock after it passes the horizontal knife, and means for segregating those portions of the stock of like compounds.

8. Apparatus for subdividing segments of rubber stock and the like embodying a plurality of dissimilar compounds employed in composite relation and distinguished by planes of separation, said apparatus comprising means carrying the stock along a generally linear path, a plurality of successive stations arranged in spaced relation along the path of travel of the stock, means at one of the stations to sever the stock into a plurality of strips lengthwise of the stock generally in conformity with the substantially vertical planes of separation, means at another of the stations to slit at least a portion of the stock along substantially horizontal planes of separation, means heating the severing and slitting means to facilitate the cutting operation, means controlling the heating means to maintain the severing and slitting means at a predetermined temperature during the cutting operation, means adjusting the severing means, adjustable means feeding the stock to the severing means, means adjustably controlling the position of the cut in the stock taken by the slitting means, and means segregating the severed portions of the stock according to like compounds.

9. Apparatus for subdividing segments of rubber stock and the like embodying a plurality of dissimilar compounds employed in composite relation and distinguished by planes of separation, said apparatus comprising means conducting the stock along a generally linear path, means arranged in successive spaced relation along the path of travel of the stock to subdivide the stock both vertically and horizontally generally in conformity with the planes of separation of the dissimilar compounds, means adjustably controlling the position of the cut in the stock taken by the subdividing means, means heating the subdividing means to facilitate the operation, and means segregating the subdivided stock according to like compounds.

10. Apparatus for reclaiming rubber tread stock and the like embodying a plurality of dissimilar compounds identified by planes of separation therebetween, said apparatus comprising a frame, a stock carrier, a pair of bight rolls one of which is adjustably mounted, adjustable guide means cooperating with the carrier to introduce the stock to the rolls, a pair of brackets mounted in said frame, a substantially vertically disposed knife adjustably secured to each bracket, means adjusting the bracket to cause the knives to cut into the stock advanced by the bight rolls generally along the substantially vertical planes of separation of the dissimilar compounds in the stock, an endless belt receiving portions of the stock severed by the vertical knives a second pair of bight rolls, an auxiliary stock carrier for conveying a remaining portion of the stock passing the vertical knives to the second pair of bight rolls, a fixed horizontal knife, means adjusting the second pair of bight rolls to regulate the depth of cut taken in the stock by the horizontal knife to conform generally to the substantially horizontal plane of separation of the dissimilar compounds in the stock, means heating the several knives, means controlling the heating means to maintain the temperature of the knives at a predetermined temperature for the duration of the cutting operation, and means diverting the cut stock portions to segregate the same according to like compounds.

11. A cutting mechanism for separating material longitudinally into strips, said mechanism comprising a plurality of cutting elements arranged in spaced relation, each of said cutting elements embodying a blade portion and means mounted thereon for deflecting the material being cut away from one side of the blade after it passes the cutting edge, and means adjustably positioning the blades in angular relation to the longitudinal direction of the cut for directing the cut material away from the other side of the blade.

12. A cutting mechanism for separating rubber stock and the like into a plurality of longitudinally extending strips, said mechanism comprising an adjustable supporting means, a plurality of cutting elements arranged in spaced relation along the supporting means, means heating said cutting elements, deflecting means on said cutting elements, and adjustable mountings for securing the cutting elements to the supporting means, said deflecting means with said cutting elements cooperating to deflect the cut stock away from the cutting elements after it has passed the cutting edges thereof to prevent cooling of the cutting elements.

EVERETT D. GEORGE.

REFERENCES CITED

The following references are of record in the file of this patent:

UNITED STATES PATENTS

| Number | Name | Date |
| --- | --- | --- |
| 1,584,371 | Griffiths | May 11, 1926 |
| 1,694,441 | Gouldbourn et al. | Dec. 11, 1928 |
| 2,251,282 | Huizeng | Aug. 5, 1941 |
| 2,365,404 | Gamel | Dec. 19, 1944 |

Certificate of Correction

Patent No. 2,484,619                                         October 11, 1949

EVERETT D. GEORGE

It is hereby certified that errors appear in the printed specification of the above numbered patent requiring correction as follows:

Column 4, line 33, for the word "plate" read *blade*; column 10, line 17, strike out "cooperating" and insert the same in line 16, before "with";

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*